United States Patent
Lee et al.

(10) Patent No.: US 7,570,449 B2
(45) Date of Patent: Aug. 4, 2009

(54) RETRACT CONTROL METHOD OF HDD AND HDD USING THE SAME

(75) Inventors: Dong wook Lee, Suwon-si (KR); Byoung kul Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 11/633,541

(22) Filed: Dec. 5, 2006

(65) Prior Publication Data

US 2007/0127151 A1 Jun. 7, 2007

(30) Foreign Application Priority Data

Dec. 7, 2005 (KR) .................... 10-2005-0118672

(51) Int. Cl.
G11B 21/12 (2006.01)
G11B 5/54 (2006.01)
(52) U.S. Cl. ....................................................... 360/75
(58) Field of Classification Search ................ None
See application file for complete search history.

(56) References Cited

U.S. PATENT DOCUMENTS 5,602,691 A * 2/1997 Iwabuchi .................... 360/75
5,663,846 A * 9/1997 Masuoka et al. ............. 360/75
6,108,157 A * 8/2000 Yoneda et al. ............... 360/75
6,236,527 B1 * 5/2001 Uchiike et al. .............. 360/75
6,496,319 B1 * 12/2002 Kusumoto et al. ........... 360/75
6,580,574 B1 * 6/2003 Codilian .................... 360/75
7,106,541 B2 * 9/2006 Bruner et al. ............... 360/75
7,113,363 B2 * 9/2006 Saito ......................... 360/75

FOREIGN PATENT DOCUMENTS

| JP | 06-96486 | 4/1994 |
| JP | 06-203503 | 7/1994 |
| JP | 2000-357364 | 12/2000 |
| JP | 2001-60355 | 3/2001 |

* cited by examiner

Primary Examiner—Hoa T Nguyen
Assistant Examiner—James L Habermehl
(74) Attorney, Agent, or Firm—Stanzione & Kim LLP

(57) ABSTRACT

A retract control method of an HDD to prevent a head from landing on a disk due to a retract failure and an HDD using the same. The retract control method includes performing a retract operation of retracting a head on the ramp, determining whether the head is normally retracted on the ramp, when it is determined that the head is not normally retracted on the ramp, moving the head to a predetermined zone of a disk, and when the head arrives at the predetermined zone of the disk, parking the head in the predetermined zone of the disk by stopping a spindle motor. Accordingly, even when a retract operation fails, a reliable retract operation can be performed by retrying the retract operation while adjusting one or more retract parameters.

11 Claims, 5 Drawing Sheets

RETRACT CONTROL METHOD OF HDD AND HDD USING THE SAME

CROSS-REFERENCE TO RELATED APPLICATIONS

This application claims the priority under 35 U.S.C. 119 §(a) from of Korean Patent Application No. 10-2005-0118672, filed on Dec. 7, 2005, in the Korean Intellectual Property Office, the disclosure of which is incorporated herein in its entirety by reference.

BACKGROUND OF THE INVENTION

1. Field of the Invention

The present general inventive concept relates to a hard disk drive (HDD), to retracting a head, and more particularly, to a retract control method of an HDD to prevent a head from landing on a disk due to a retract failure and an HDD using the same.

2. Description of the Related Art

An HDD is a recording device used to store information. The information is typically recorded on concentric tracks formed across a surface of a magnetic disk. The disk is mounted to a spindle motor, and the information is accessed by a head mounted to an actuator arm rotated by a voice coil motor (VCM). The VCM rotates an actuator by a VCM driving current, moving the head across the disk.

The head reads the information recorded on the surface of the disk by sensing a variation of a magnetic field formed on the surface of the disk. To record data on the disk, a write current is supplied to the head, generating a magnetic field from the head. The data is recorded on the disk by magnetizing the surface of the disk using the generated magnetic field.

In the HDD, an operation of retracting the head on a ramp (hereinafter known as a "retract operation") is performed when power saving is required or when it is necessary to protect the head and the disk from shock from an outside of the HDD, such as when an idle state is maintained, when the shock from the outside of the HDD is sensed, when a free-fall state is detected, when an operation of the HDD is finished, or when driving power of the HDD is suddenly cut off.

Figure 1:
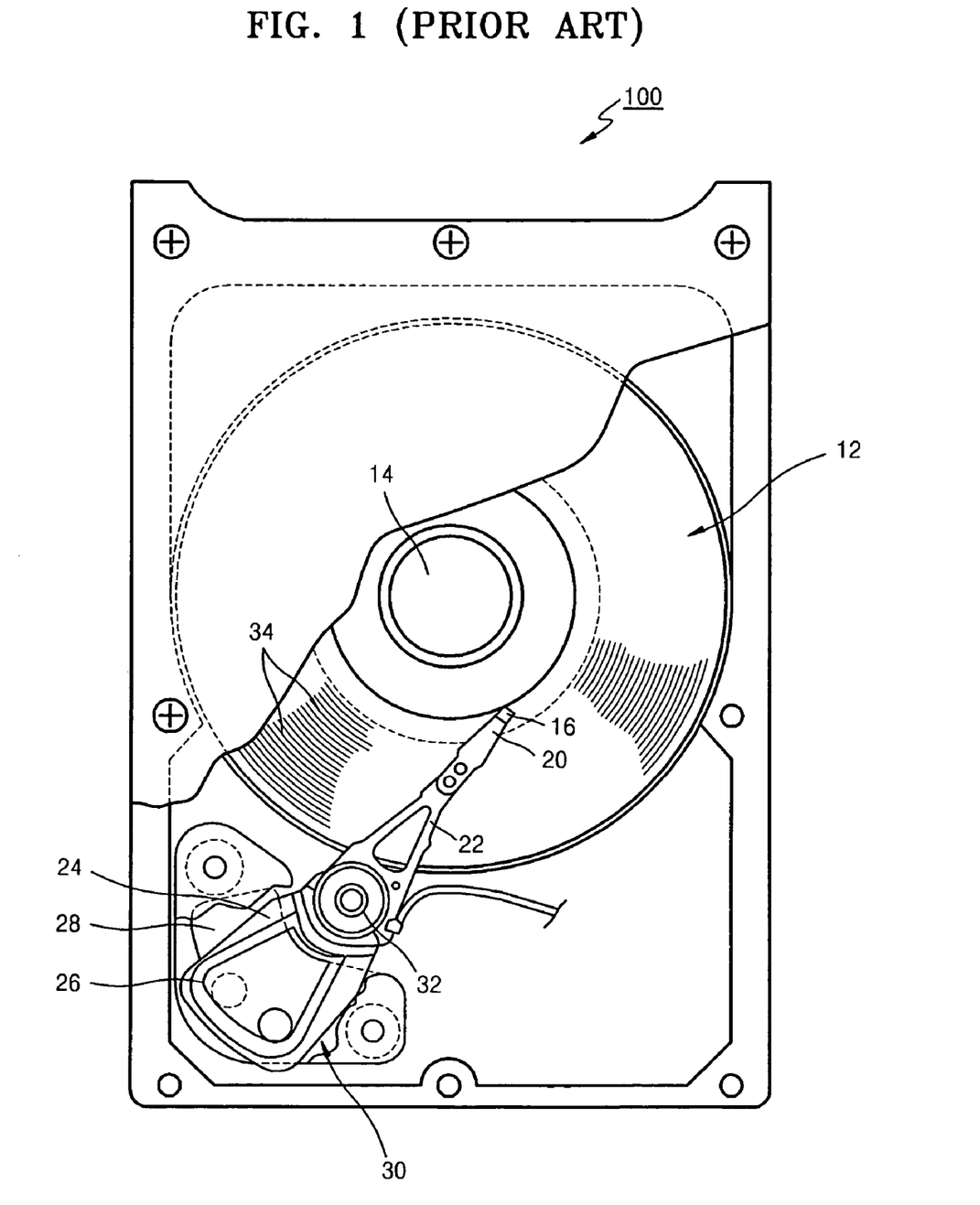
FIG. 1 is a schematic plan view illustrating an HDD using a ramp structure.

FIG. 1 is a schematic plan view illustrating an HDD 100 using a ramp structure.

Referring to FIG. 1, the HDD 100 includes at least one disk 12 rotated by a spindle motor 14. The HDD 100 also includes at least one head 16 adjacently located to a surface of the at least one disk 12.

The head 16 can read or write information from or on the rotating disk 12 by sensing a magnetic field formed in magnetic regions 34 on the surface of the disk 12 or magnetizing the magnetic regions 34 on the surface of the disk 12. Though a single head 16 is shown in FIG. 1, the head 16 includes a write head for magnetizing the disk 12 and a separated read head for sensing the magnetic field of the disk 12.

The head 16 can be assembled on a slider (not shown). The slider is formed in such a structure to generate an air bearing between the head 16 and the surface of the disk 12. The slider is combined with a suspension 20. The suspension 20 is combined with a head stack assembly (HSA) 22. The HSA 22 is attached to an actuator arm 24 having a voice coil 26. The voice coil 26 is located adjacently to a magnetic assembly 28 specifying (supporting) a voice coil motor (VCM) 30 together with the voice coil 26. A current supplied to the voice coil 26 generates a torque which rotates the actuator arm 24 around a bearing assembly 32. The rotation of the actuator arm 24 moves the head 16 across the surface of the disk 12.

Figure 2:
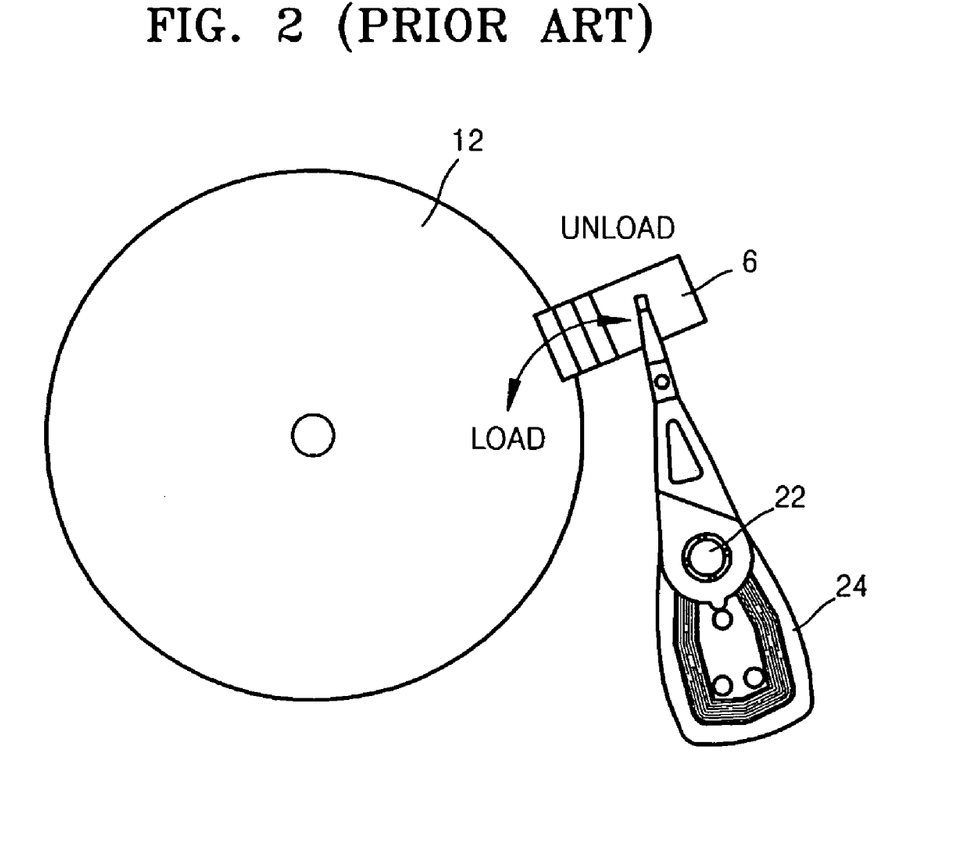
FIG. 2 schematically illustrates a retract operation using a ramp of the HDD of FIG. 1.

When the HDD 100 illustrated in FIG. 1 performs a retract operation, the head 16 is laid on a ramp 6 illustrated in FIG. 2, which is installed in the side of the outer circumference of the disk 12.

FIG. 2 schematically illustrates the retract operation using the ramp 6. Referring to FIGS. 1 and 2, when the retract operation commences, the head 16 retracts (unloads) onto the ramp 6 from the disk 12.

Figure 3:
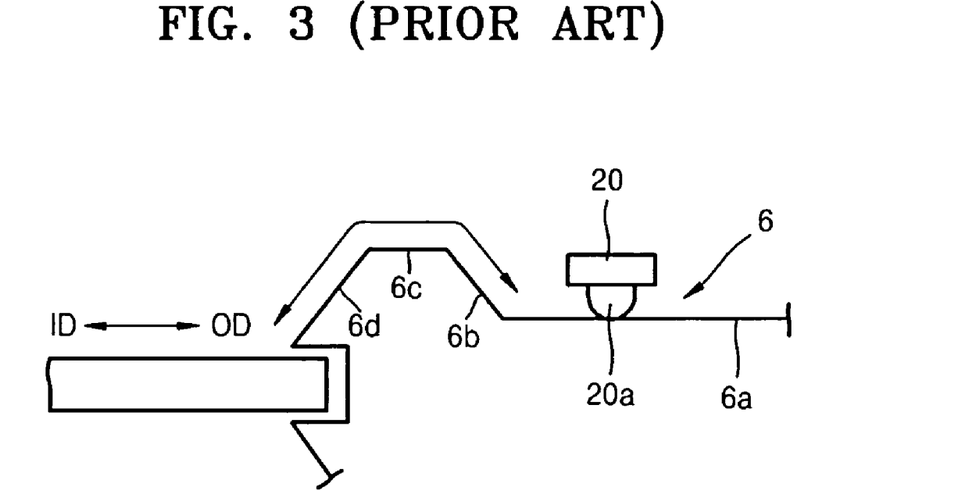
FIG. 3 is a cross-sectional view illustrating the ramp of FIG. 2.

FIG. 3 is a cross-sectional view illustrating the ramp 6 of FIG. 2. The ramp 6 has a cross section of a ladder shape and includes a first incline 6d, a flat surface 6c, a second incline 6b, and a safety zone 6a. Referring to FIGS. 1-3, when the retract operation is performed, the head 16 rises along the first incline 6d, and lands in the safety zone 6a. In reality, a projection 20a projected under the slider 20 contacts the ramp 6.

When the retract operation fails, i.e., if the head 6 cannot rise over the first incline 6d of the ramp 6, the head 16 lands on the disk 12, and thus the head 16 and the disk 12 may be damaged. In particular, in a small-sized HDD used for a mobile device, if the head 16 lands on the disk 12, the HDD cannot be used any more in most cases due to the sticking between the head 16 and the disk 12.

Thus, a retract control method for guaranteeing a trustworthy retract operation is required.

SUMMARY OF THE INVENTION

The present general inventive concept provides a retract control method of a hard disk drive (HDD) to prevent a head from landing on a disk due to a retract failure.

The present general inventive concept also provides an HDD using the retract control method.

The present general inventive concept also provides a retract completion determination method of determining whether a retract operation is successfully performed in an HDD using a ramp structure.

Additional aspects and advantages of the present general inventive concept will be set forth in part in the description which follows and, in part, will be obvious from the description, or may be learned by practice of the general inventive concept.

The foregoing and/or other aspects of the general inventive concept may be achieved by providing a retract control method of a hard disk drive (HDD) using a ramp structure, the method including performing a retract operation of retracting a head on a ramp, determining whether the head is normally retracted on the ramp, upon determining that the head is not normally retracted on the ramp, moving the head to a predetermined zone of a disk, and if the head arrives at the predetermined zone of the disk, parking the head in the predetermined zone of the disk by stopping a spindle motor.

The foregoing and/or other aspects of the general inventive concept may also be achieved by providing a retract control method of a hard disk drive (HDD) using a ramp structure the method including detecting a variation of a spindle motor driving current while driving a voice coil motor (VCM) to land the head on a ramp when a retract operation starts, adjusting retract parameters to increase driving power of the VCM driving the head when the spindle motor driving current does not maximize its variance after a predetermined time, such that the head lands on the ramp, and retrying the retract operation with the adjusted parameters.

The foregoing and/or other aspects of the general inventive concept may also be achieved by providing a retract completion determination method of determining whether a retract operation is successfully performed in an HDD using a ramp structure, the method including a determination whether a retract operation is normally performed, by using a difference between the amplitude of a spindle motor driving current in a situation where a head is on a disk, and the amplitude of the spindle motor driving current in a situation where the head is on the ramp.

The foregoing and/or other aspects of the general inventive concept may also be achieved by providing a hard disk drive (HDD) using a ramp structure, the HDD including a head, a voice coil motor (VCM) to drive the head, a spindle motor to rotate a disk, a controller to control a driving current of the VCM to retract the head on the ramp, to determine whether the head is normally retracted on the ramp when performing a retract operation of retracting the head on the ramp, to move the head to a predetermined zone of the disk upon determining that the head is not normally retracted on the ramp, and to park the head in the predetermined zone of the disk by stopping the spindle motor if the head arrives at the predetermined zone of the disk.

The foregoing and/or other aspects of the general inventive concept may also be achieved by providing a hard disk drive (HDD) using a ramp structure, the HDD including a head, a voice coil motor (VCM) to drive the head, a spindle motor to rotate a disk, a controller to control a driving current of the VCM to retract the head on the ramp, to detect a variation of a spindle motor driving current while driving the VCM to land the head on the ramp when performing a retract operation of retracting the head on the ramp, to adjust retract parameters to increase driving power of the VCM driving the head if the spindle motor driving current does not maximize its variance after a predetermined time, such that the head lands on the ramp, and retries the retract operation with the adjusted retract parameters.

The foregoing and/or other aspects of the general inventive concept may also be achieved by providing a hard disk drive (HDD) using a ramp structure, the HDD including a head, a voice coil motor (VCM) to drive the head, a spindle motor to rotate a disk, a controller to control a driving current of the VCM to retract the head on the ramp, to determine whether a retract operation is normally performed when performing a retract operation of retracting the head on the ramp, using a difference between the amplitude of a spindle motor driving current in a situation where the head is on the disk and the amplitude of the spindle motor driving current in a situation where the head is on the ramp, and to retry the retract operation upon determining that the retract operation is not normally performed.

The foregoing and/or other aspects of the general inventive concept may also be achieved by providing a computer readable recording medium containing computer readable code to perform a retract method, the method including performing a retract operation of retracting a head on a ramp, determining whether the head is normally retracted on the ramp, moving the head to a predetermined zone of a disk when it is determined that the head is not normally retracted on the ramp, and parking the head in the predetermined zone of the disk by stopping a spindle motor when the head arrives at the predetermined zone of the disk.

The foregoing and/or other aspects of the general inventive concept may also be achieved by providing a computer readable recording medium containing computer readable code to perform a retract method, the method including detecting a variation of a spindle motor driving current while driving a voice coil motor (VCM) to land a head on a ramp when a retract operation starts, adjusting retract parameters to increase a driving power of the VCM to drive the head when the spindle motor driving current does not maximize its variance after a predetermined time so that the head lands on the ramp, retrying the retract operation with the adjusted retract parameters.

The foregoing and/or other aspects of the general inventive concept may also be achieved by providing a computer readable recording medium containing computer readable code to perform a retract completion determination method, the method including determining whether a retract operation is successfully performed in an HDD using a ramp structure, and determining using a difference between a first amplitude of a spindle motor driving current when a head is on a disk and a second amplitude of the spindle motor driving current when the head is on a ramp whether a retract operation is normally performed.

The foregoing and/or other aspects of the general inventive concept may also be achieved by providing a retract completion determination method for determining whether a retract operation is successfully performed in an HDD using a ramp structure including determining if a current linearly increases from a low value to a high value and then maintains a constant value, where the increase of the current from a low value to a high value directly corresponds with the movement of a head from an innermost circumference of a disk to an outermost circumference of the disk, and where the current maintaining a constant value directly corresponds with the head being on a ramp.

The foregoing and/or other aspects of the general inventive concept may also be achieved by providing a method for maximizing user data protection including adjusting a retract parameter of the retract operation upon determining an abnormal performance of a retract operation, and moving a head to a zone on a surface of a disk upon detecting whether the retract operation is performed according to adjacent retract parameters.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 4:
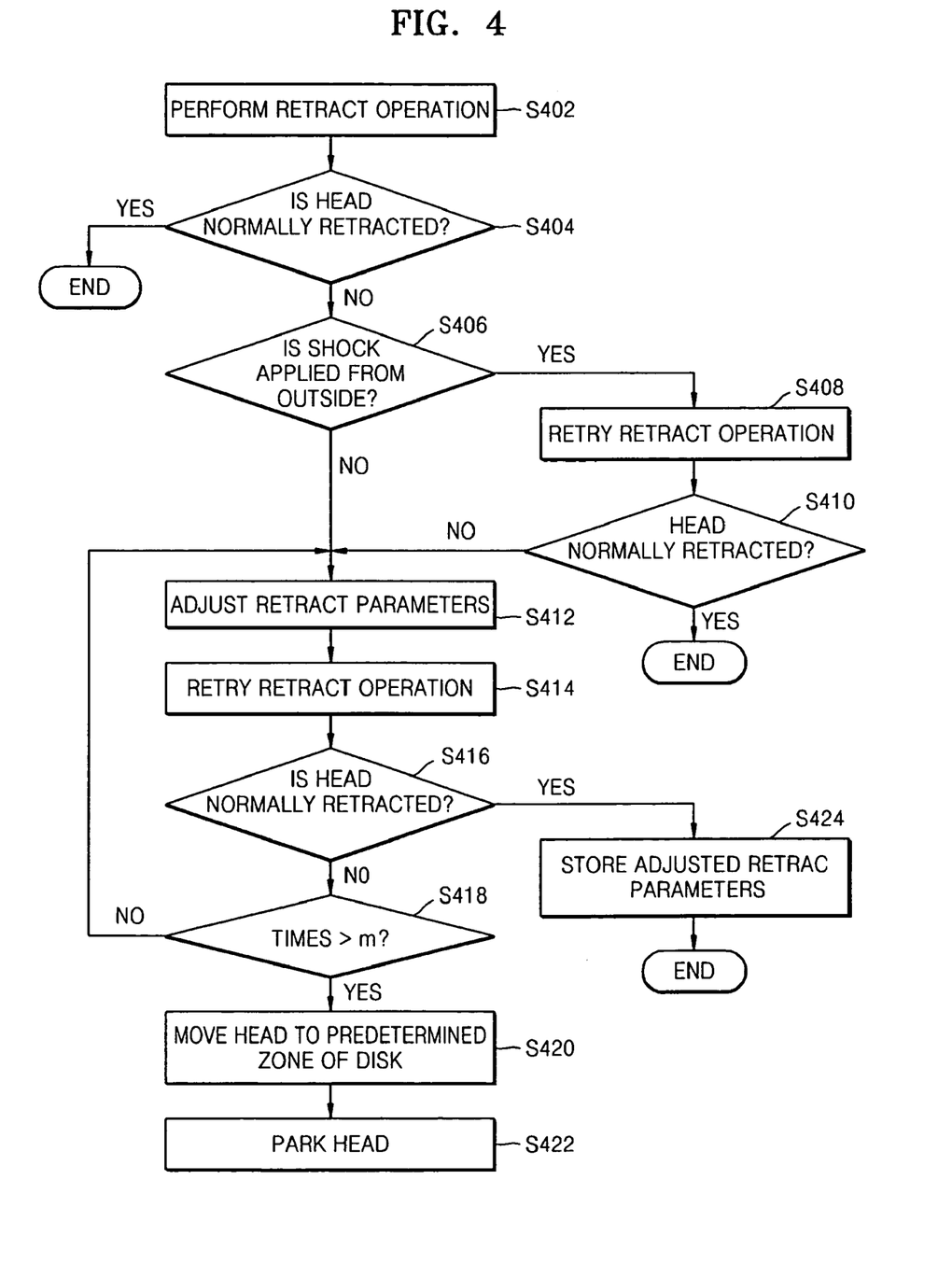
FIG. 4 is a flowchart illustrating a retract control method of an HDD according to an embodiment of the present general inventive concept.

FIG. 4 is a flowchart illustrating a retract control method of a hard disk drive (HDD), according to an embodiment of the present general inventive concept.

Referring to FIG. 4, in operation S402, a first retract operation is performed in response to a retract command. When the retract operation is performed, a head moves to a ramp. The retract operation is performed using pre-designed retract parameters. Examples of the retract parameters include a driving current of a VCM and a time when a maximum retract current is applied.

Figure 5:
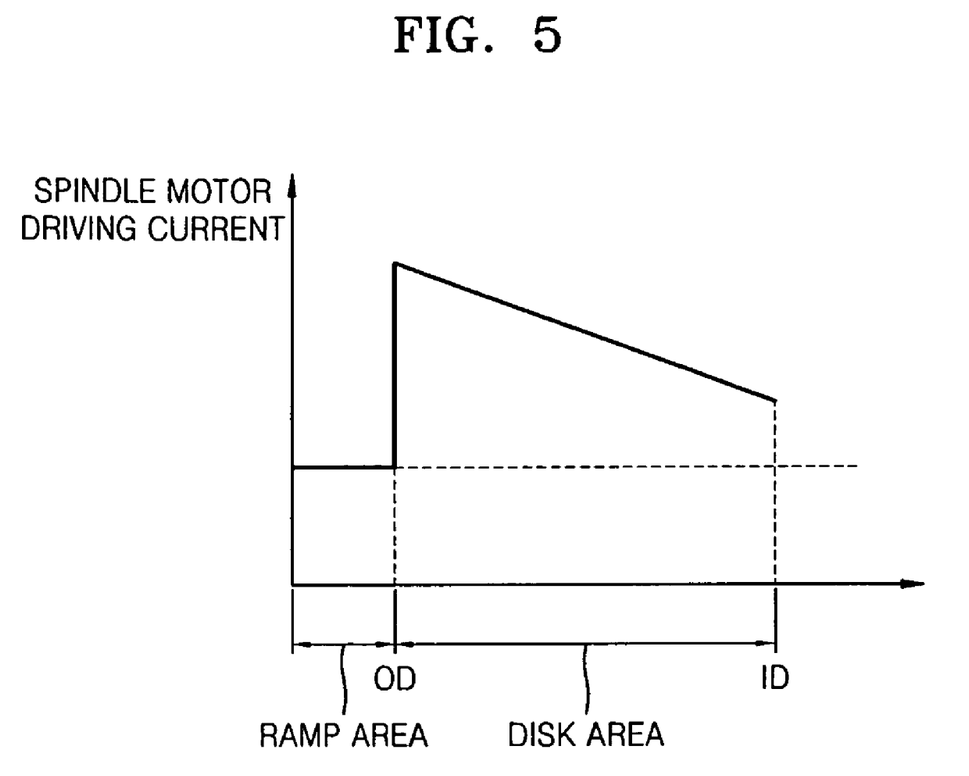
FIG. 5 is a diagram illustrating a method of determining whether a retract operation is finished according to an embodiment of the present general inventive concept.

In operation S404, it is determined whether the head is normally retracted on the ramp, i.e., whether the retract operation fails. Whether the head is normally retracted on the ramp 6 is determined by detecting a driving current of a spindle motor as illustrated in FIG. 5. Operation S404 may be performed for a predetermined time after operation S402. The predetermined time is determined as the time sufficient for the head to move from a disk to the ramp.

Upon determining in operation S404 that the head is not normally retracted on the ramp, in operation S406 it is determined whether the HDD 100 is shocked from an outside of the HDD during the retract operation. Since the shock from the outside of the HDD affects the retract operation as disturbance, the retract operation may fail due to the shock from the outside of the HDD. In particular, if the shock from the outside of the HDD occurs in a direction opposite to a head movement direction, probability of retract failure is high. If it is determined in operation S406 that the HDD is not shocked from the outside of the HDD during the retract operation, the retract control method proceeds to operation S412.

Upon determining in operation S406 that the HDD 100 is shocked from the outside of the HDD during the retract operation, the retract operation is retried in operation S408. The retract operation of operation S408 is performed with the pre-designed parameters as in the case of operation S402.

In operation S410, it is determined whether the head is normally retracted on the ramp.

Upon determining in operation S410 that the head is not normally retracted on the ramp, the retract control method proceeds to operation S412. If the retract operation fails even without the shock from the outside of the HDD, there is a high probability that the pre-designed retract parameters are not suitable for the HDD due to a change of the HDD with the lapse of time.

In operation S412, the pre-designed retract parameters are adjusted. For example, the driving current of the VCM and the time when the maximum retract current is applied are increased by a predetermined value.

In operation S414, the retract operation is retried with the adjusted retract parameters.

In operation S416, it is determined whether the head is normally retracted on the ramp. Upon determining in operation S416 that the head is normally retracted on the ramp, the adjusted retract parameters are stored during operation S424. The stored retract parameters are used in a subsequent retract operation by replacing the pre-designed retract parameters.

Upon determining in operation S416 that the head is not normally retracted on the ramp, the retract operation is retried by adjusting the retract parameters by predetermined times m using operations S412 through S418.

Upon retract operation failure despite the re-implementation of the retract operation by adjusting the retract parameters by the predetermined times m using operations S412 through S418, the head moves to a predetermined zone of the disk in operation S420. That is, upon retract operation failure despite the re-implementation of the retract operation by adjusting the retract parameters by the predetermined times m using operations S412 through S418, a fatal error is determined and the head is parked on the disk which contains highly-protected user data.

The predetermined zone of the disk may be a zone in the outermost circumference, a zone in the innermost circumference, or a zone in which the user data is not recorded. The movement of the head to the outermost circumference or the innermost circumference of the disk is achieved by moving the head to an outer crash stop or an inner crash stop. The outer crash stop and the inner crash stop are used to limit a head movement range.

If the head moves to the predetermined zone of the disk, in operation S422, the head is parked on the disk by stopping the spindle motor.

As described above, the retract control method according to an embodiment of the present general inventive concept increases reliability of the retract operation by retrying the retract operation while changing retract parameters when the retract operation fails.

FIG. 5 is a diagram illustrating a method of determining whether a retract operation is finished according to an embodiment of the present general inventive concept. FIG. 5 illustrates a variation of a spindle motor driving current according to a position of a head on a disk or a ramp. In the HDD, the disk must rotate at a constant speed. Thus, if there does not exist any disturbance, a spindle motor is driven by the spindle motor driving current having a constant amplitude. However, if the head is loaded on the disk, the head disturbs the rotation of the disk as disturbance, and thus, the spindle motor driving current increases to overcome this disturbance and rotate the disk at the constant speed. On the contrary, if the head is unloaded on the ramp, the head does not disturb the rotation of the disk any more, and thus, the spindle motor driving current decreases.

Referring to FIG. 5, while the head moves from the inner circumference to the outer circumference, the spindle motor driving current linearly increases, and if the head is unloaded on the ramp, the spindle motor driving current dramatically decreases and maintains a constant value. While the head moves from the outer circumference to the inner circumference, the spindle motor driving current linearly decreases according to a radius of the disk.

According to experiments, when the head is unloaded on the ramp, the amplitude of the spindle motor driving current is less than that in any position of the head on the disk .

Thus, it can be determined whether the head is normally retracted on the ramp by detecting a variation of the spindle motor driving current while the head moves to the ramp .

Figure 6:
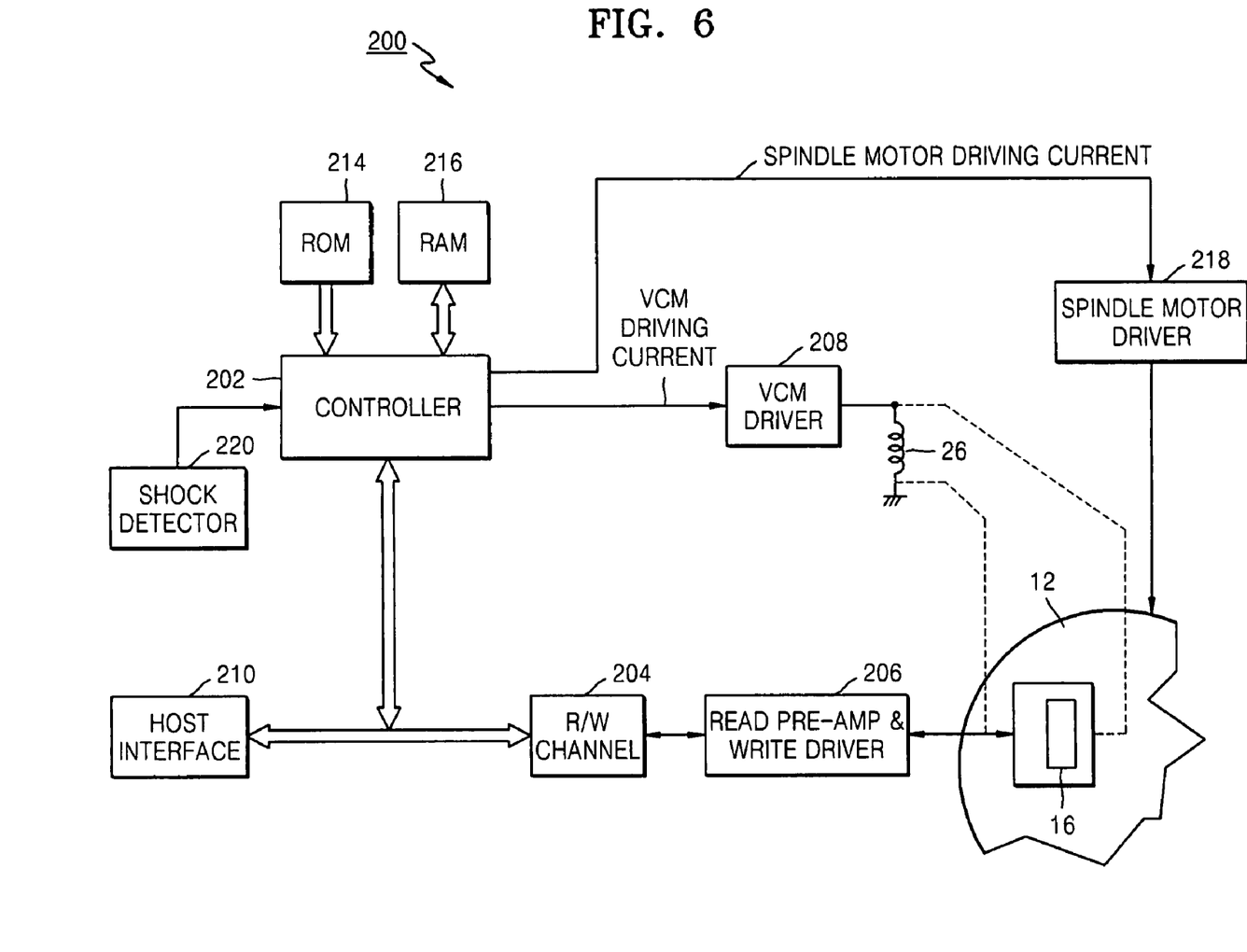
FIG. 6 is a block diagram illustrating a control apparatus to control an HDD using a retract control method, according to an embodiment of the present general inventive concept.

FIG. 6 is a block diagram illustrating a control apparatus 200 to control an HDD 100 using a retract control method, according to an embodiment of the present general inventive concept.

Referring to FIG. 6, the control apparatus 200 includes a controller 202 connected to the head 16 through a read/write (R/W) channel circuit 204 and a read pre-amplifier & write drive circuit 206. The controller 202 may be a digital signal processor (DSP), a microprocessor, or a micro-controller. A shock detector 220 detects a shock applied to the HDD 100 from an outside of the HDD 100.

The controller 202 provides a control signal to the R/W channel circuit 204 to read or write data from or on the disk 12.

Information is typically transmitted from the R/W channel circuit 204 to a host interface circuit 210. The host interface circuit 210 includes a control circuit (not shown) to interface with a host computer (not shown) such as a personal computer (PC).

In a data read mode, the R/W channel circuit 204 converts an analog signal read by using the head 16, amplifies the analog signal by using a read pre-amplifier & write driver circuit 206 to a host computer-readable digital signal, and outputs the digital signal to the host interface circuit 210. In a data write mode, the R/W channel circuit 204 receives data from the host computer via the host interface circuit 210, converts the data to a disk-recordable write current, and outputs the write current to the read pre-amplifier & write drive circuit 206.

The controller 202 is also connected to a VCM driver 208 to supply a driving current to the voice coil 26. The controller 202 provides a control signal to the VCM driver 208 to control activation of the VCM 30 and a motion of the head 16.

The controller 202 is also connected to a nonvolatile memory, such as a read only memory (ROM) 214 or a flash memory, and a random access memory (RAM) 216. The memories 214 and 216 store instructions and data, which are used by the controller 202 to execute software routines.

One of the software routines is a software routine for to execute the retract control method illustrated in FIG. 4.

During the retract operation, the controller 202 performs the retract operation by controlling the VCM driver 208 and a spindle motor driver 218 using the retract control method illustrated in FIG. 4. The controller 202 controls the head to move to the ramp 6, pass along the first incline 6d, the flat surface 6c, and the second incline 6b and land on the safety zone 6a.

In addition, the controller 202 determines whether the retract operation is normally performed, and if the retract operation is not normally performed, the controller 202 retries the retract operation by adjusting retract parameters while referring to a detection result of the shock detector 220.

In detail, in the retract operation, the controller 202 detects a variation of the spindle motor driving current while driving the VCM 30 to move the head 16 onto the ramp 6, and after a predetermined time if the spindle motor driving current does not decrease to a minimum active level such that that the head 16 has landed on the ramp 6, the controller 202 adjusts the retract parameters to increase driving power of the VCM 30 to drive the head 16 and retries the retract operation with the adjusted retract parameters.

Upon determining that the retract operation is not normally performed and that a shock from the outside of the HDD is detected by the shock detector 220 during the retract operation, the controller 202 retries the retract operation with the pre-designed retract parameters.

Upon determining the retract operation is not normally performed despite the repeated execution of the retract operation by adjusting the retract parameters by predetermined times m, in order to maximize the user data protection, the controller moves the head 16 to the zone in the outermost circumference of the disk 12, the zone in the innermost circumference of the disk 12, or the zone in which the user data is not recorded, and parks the head 16 on the disk 12 by stopping the spindle motor 14.

The present general inventive concept can be realized as a method, an apparatus, and/or a system. When the present general inventive concept is realized as software, components of the present general inventive concept are embodied as code segments for executing required operations, which can be executed by a processor or computer readable recording medium. A program or the code segments can be stored in a processor or computer readable recording medium The processor readable recording medium is any data storage device that can store or transfer data which can be thereafter read by a computer system. Examples of the processor readable recording medium include electronic circuits, semiconductor memory devices, read-only memory (ROM), flash memory, erasable ROM, floppy disks, and hard disk.

As described above, by a retract control method according to present general inventive concept, despite a retract operation failure due to a shock applied from outside the HDD during the retract operation or a situation where pre-designed retract parameters are no longer suitable for the HDD due to a change of the HDD with the lapse of time, a reliable retract operation can be performed by retrying the retract operation while adjusting the retract parameters.

In addition, upon determining that the retract operation cannot be performed due to a fatal error, user data protection may be maximized by moving a head to a zone in which the user data is not recorded and parking the head on a disk.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A retract control method of a hard disk drive (HDD) using a ramp structure, the method comprising:

performing a retract operation of retracting a head on a ramp;

determining whether the head is normally retracted on the ramp;

when it is determined that the head is not normally retracted on the ramp, moving the head to a predetermined zone of a disk;

when the head arrives at the predetermined zone of the disk, parking the head in the predetermined zone of the disk by stopping a spindle motor;

wherein the moving of the head to the predetermined zone of the disk comprises moving the head to a crash stop.

2. The method of claim 1, wherein the determining of whether the head is normally retracted on the ramp comprises determining whether the retract operation is normally performed based on a difference between a first amplitude of a spindle motor driving current in a situation where the head is on the disk and a second amplitude of the spindle motor driving current in a situation where the head is on the ramp.

3. The method of claim 1, wherein the moving of the head to the predetermined zone of the disk comprises moving the head to a zone of the disk in which user data is not recorded.

4. The method of claim 1, further comprising:

when it is determined that the head is not normally retracted on the ramp, adjusting retract parameters to increase a driving power of a voice coil motor (VOM) to drive the head; and retrying the retract operation with the adjusted retract parameters.

5. The method of claim 1, further comprising:

determining whether a shock from an outside of the HDD is applied to the HDD during the retract operation; and when it is determined that the shock from the outside of the HDD is applied, retrying the retract operation.

6. A hard disk drive (HDD) using a ramp structure, the HDD comprising:

a head;

a voice coil motor (VCM) to drive the head;

a spindle motor rotating a disk;

a controller to control a driving current of the VCM to retract the head on the ramp, to determine whether the head is normally retracted on the ramp when a retract operation to retract the head on the ramp is performed, to move the head to a predetermined zone of the disk when it is determined that the head is not normally retracted on the ramp, and to park the head in the predetermined zone of the disk by stopping the pindle motor when the head arrives at the predetermined zone of the disk;

wherein the controller moves the head to a crash stop.

7. The HDD of claim 6, wherein the controller determines whether the retract operation is normally performed, based on a difference between a first anplitude of a spindle motor driving current in a situation where the head is on the disk and a second amplitude of the spindle motor driving current in a situation where the head is on the ramp.

8. The HDD of claim 6, wherein the controller moves the head to a zone of the disk in which user data is not recorded.

9. The HDD of claim 6, wherein when it is determined that the head is not normally retracted on the ramp, the controller adjusts retract parameters to increase driving power of the VOM driving the head and retries the retract operation with the adjusted retract parameters.

10. The HDD of claim 6, wherein the controller determines whether a shock from an outside of the HDD is applied to the HDD during the retract operation and retries the retract operation when it is determined that the shock from the outside of the HDD is applied.

11. A computer readable recording medium containing computer readable code to perform a retract method, the method comprising:

performing a retract operation of retracting a head on a ramp;

determining whether the head is normally retracted on the ramp;

when it is determined that the head is not normally retracted on the ramp, moving the head to a predetermined zone of a disk; and when the head arrives at the predetermined zone of the disk, parking the head in the predetermined zone of the disk by stopping a spindle motors;

wherein the moving of the head to the predetermined zone of the disk comprises moving the head to a crash stop.

* * * * *